United States Patent
Shimamoto

(10) Patent No.: US 11,705,696 B2
(45) Date of Patent: Jul. 18, 2023

(54) SPARK PLUG FOR INTERNAL COMBUSTION ENGINE

(71) Applicant: DENSO CORPORATION, Kariya (JP)

(72) Inventor: Daisuke Shimamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/901,003

(22) Filed: Sep. 1, 2022

(65) Prior Publication Data

US 2022/0416514 A1   Dec. 29, 2022

Related U.S. Application Data

(63) Continuation of application No. PCT/JP2021/004291, filed on Feb. 5, 2021.

(30) Foreign Application Priority Data

Mar. 4, 2020 (JP) .................. 2020-036338

(51) Int. Cl.
*H01T 13/54* (2006.01)
*H01T 13/32* (2006.01)
*H01T 13/38* (2006.01)

(52) U.S. Cl.
CPC .............. *H01T 13/32* (2013.01); *H01T 13/38* (2013.01); *H01T 13/54* (2013.01)

(58) Field of Classification Search
CPC ....................................................... H01T 13/54
USPC .......................................................... 313/118
See application file for complete search history.

(56) References Cited

U.S. PATENT DOCUMENTS

| | | |
|---|---|---|
| 4,987,868 A | 1/1991 | Richardson |
| 6,215,233 B1 | 4/2001 | Matsubara |
| 2013/0002122 A1 | 1/2013 | Kowalski et al. |
| 2014/0102404 A1 | 4/2014 | Sotiropoulou et al. |
| 2016/0047295 A1 | 2/2016 | Sotiropoulou et al. |
| 2016/0218486 A1 | 7/2016 | Mitsuda et al. |

(Continued)

FOREIGN PATENT DOCUMENTS

| | | |
|---|---|---|
| DE | 10 2014 004 943 | 2/2015 |
| JP | 7-235363 | 9/1995 |
| JP | 2007-35570 | 2/2007 |

*Primary Examiner* — Christopher M Raabe
(74) *Attorney, Agent, or Firm* — Nixon & Vanderhye P.C.

(57) ABSTRACT

A spark plug for an internal combustion engine includes a housing, an insulator, a center electrode, a ground electrode, and an auxiliary chamber forming portion. The ground electrode faces the center electrode from an outer peripheral side and forms a discharge gap between the ground electrode and the center electrode. An auxiliary chamber is formed inside the auxiliary chamber forming portion. A distance in an axial direction between the discharge gap and a distal end of the auxiliary chamber is equal to or greater than a maximum wall thickness of the auxiliary chamber forming portion. The auxiliary chamber forming portion includes injection holes. The injection holes are formed in a state where openings on an outer side are located closer to a distal end than openings on the auxiliary chamber side. At least one of the injection holes is an injection hole in the axial direction formed along an axial direction of a plug. When viewed in the axial direction of the spark plug, a center of the axial injection hole is eccentric from a central axis of the spark plug toward the discharge gap.

6 Claims, 17 Drawing Sheets

(56) References Cited

U.S. PATENT DOCUMENTS

2018/0219356 A1     8/2018  Jung
2020/0335949 A1 *  10/2020  Gozawa .................. H01T 13/39

* cited by examiner

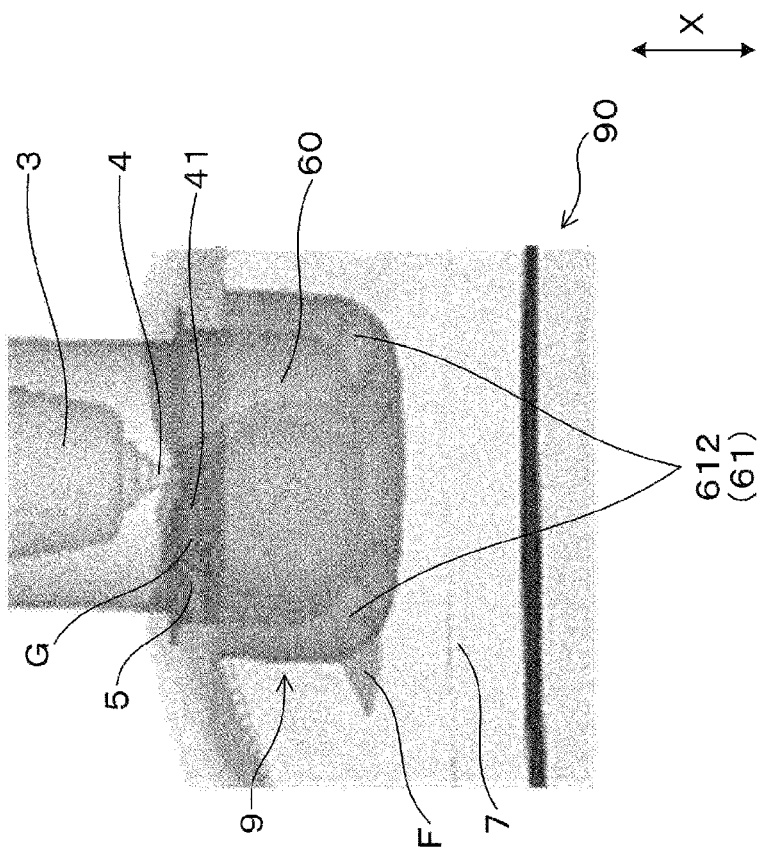
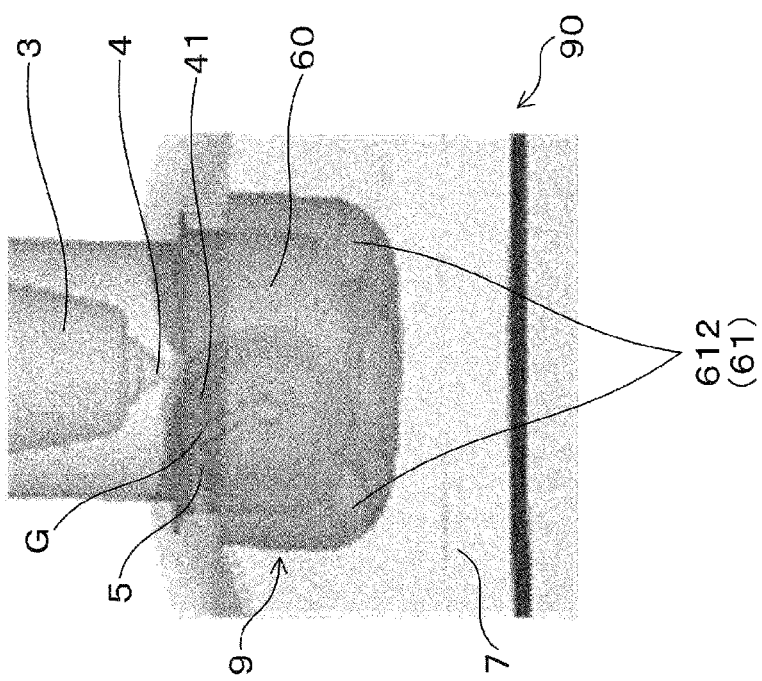

SPARK PLUG FOR INTERNAL COMBUSTION ENGINE

CROSS-REFERENCE TO RELATED APPLICATION

This application is the U.S. bypass application of International Application No. PCT/JP2021/004291 filed on Feb. 5, 2021 which designated the U.S. and claims priority to Japanese Patent Application No. 2020-036338 filed on Mar. 4, 2020, the contents of both of which are incorporated herein by reference.

TECHNICAL FIELD

The present disclosure relates to a spark plug for an internal combustion engine.

BACKGROUND

A spark plug including an auxiliary chamber surrounding a discharge gap is disclosed in, for example, JP 2016-53370 A.

Such a spark plug forms a flame by igniting an air-fuel mixture in the auxiliary chamber. Further, the flame formed in the auxiliary chamber is ejected from injection holes through which the auxiliary chamber is communicated with a main combustion chamber. As a result of this, the flame propagates into the main combustion chamber and burns the air-fuel mixture.

JP 2016-53370 A discloses encouraging development of the flame by utilizing a rebound effect of an air flow in the auxiliary chamber.

SUMMARY

A spark plug for an internal combustion engine according to one aspect of the present disclosure includes a cylindrical housing, a cylindrical insulator held inside the housing, a center electrode held inside the insulator and projecting on a distal end side of the insulator, a ground electrode facing the center electrode from an outer peripheral side and forming a discharge gap between the ground electrode and the center electrode, and an auxiliary chamber forming portion provided at a distal end portion of the housing. In which an auxiliary chamber in which the discharge gap is to be disposed is formed inside the auxiliary chamber forming portion. A distance in an axial direction between the discharge gap and a distal end of the auxiliary chamber is equal to or greater than a maximum wall thickness of the auxiliary chamber forming portion. The auxiliary chamber forming portion includes injection holes through which the auxiliary chamber is communicated with outside of the auxiliary chamber forming portion. The injection holes are formed in a state where openings on an outer side are located closer to a distal end side than openings on the auxiliary chamber side are. At least one of the injection holes is an axial injection hole formed along an axial direction of the spark plug, and when viewed in the axial direction of the spark plug, a center of the axial injection hole is eccentric from a central axis of the spark plug toward the discharge gap.

BRIEF DESCRIPTION OF THE DRAWINGS

The above features of the present disclosure will be made clearer by the following detailed description, given referring to the appended drawings. In the accompanying drawings:

FIG. 16A and FIG. 16B are CFD analysis diagrams of a flame of an internal combustion engine in which the spark plug of the first comparative embodiment is attached in the third experimental example;

DETAILED DESCRIPTION OF THE PREFERRED EMBODIMENTS

Figure 1:
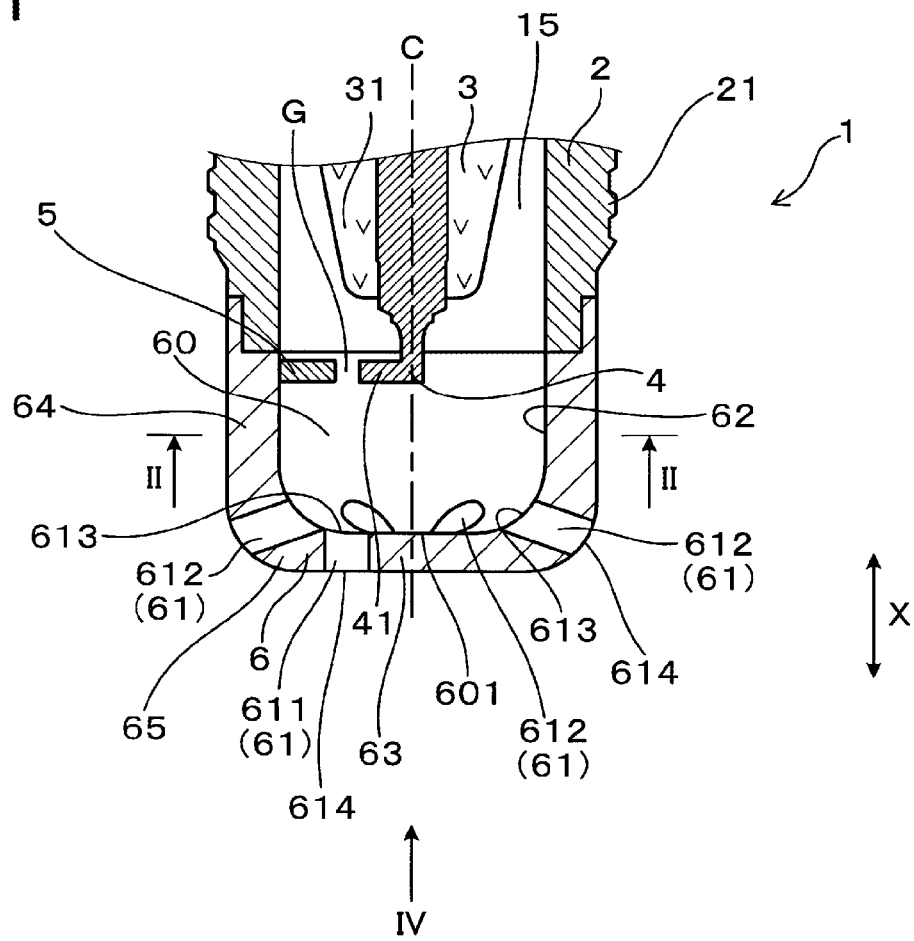
FIG. 1 is a cross-sectional diagram for explaining a distal end portion of a spark plug in a first embodiment and is a view corresponding to a cross-sectional diagram taken along a line I-I in FIG. 4.

While the spark plug disclosed in JP 2016-53370 A considers flame development, the spark plug disclosed in JP 2016-53370 A does not consider ignition of an air-fuel mixture in the auxiliary chamber, that is, formation of an initial flame itself. In other words, JP 2016-53370 A does not consider improvement in ignition performance by extending discharge in the auxiliary chamber. Further, JP 2016-53370 A does not consider ignition performance in an expansion stroke although ignition may be performed by discharge in the expansion stroke of an internal combustion engine for the purpose of, for example, increasing a catalyst temperature of an exhaust gas purification filter.

The present disclosure is directed to providing a spark plug for an internal combustion engine with excellent ignition performance.

A spark plug for an internal combustion engine according to one aspect of the present disclosure includes a cylindrical housing, a cylindrical insulator held inside the housing, a center electrode held inside the insulator and projecting on a distal end side of the insulator, a ground electrode facing the center electrode from an outer peripheral side and forming a discharge gap between the ground electrode and the center electrode, and an auxiliary chamber forming portion provided at a distal end portion of the housing. In which an auxiliary chamber in which the discharge gap is to be disposed is formed inside the auxiliary chamber forming portion. A distance in an axial direction between the discharge gap and a distal end of the auxiliary chamber is equal to or greater than a maximum wall thickness of the auxiliary chamber forming portion. The auxiliary chamber forming portion includes injection holes through which the auxiliary chamber is communicated with outside of the auxiliary chamber forming portion. The injection holes are formed in a state where openings on an outer side are located closer to a distal end side than openings on the auxiliary chamber side are. At least one of the injection holes is an axial injection hole formed along an axial direction of the spark plug, and when viewed in the axial direction of the spark plug, a center of the axial injection hole is eccentric from a central axis of the spark plug toward the discharge gap.

In the above-described spark plug, the auxiliary chamber forming portion includes the axial injection hole. Further, when viewed in the axial direction of the spark plug, the center of the axial injection hole is eccentric from the central axis of the spark plug toward the discharge gap. This makes it easy to form a strong air flow toward the distal end in the axial direction at the discharge gap in an expansion stroke of the internal combustion engine. Thus, a spark discharge formed at the discharge gap is likely to significantly extend toward the distal end in the auxiliary chamber. This can improve ignition performance of an air-fuel mixture in the auxiliary chamber, which results in making it possible to strengthen ejection of a flame to the main combustion chamber.

As described above, according to the above-described aspect, it is possible to provide a spark plug for an internal combustion engine with excellent ignition performance.

First Embodiment

An embodiment of a spark plug for an internal combustion engine will be described with reference to FIG. 1 to FIG. 7.

Figure 2:
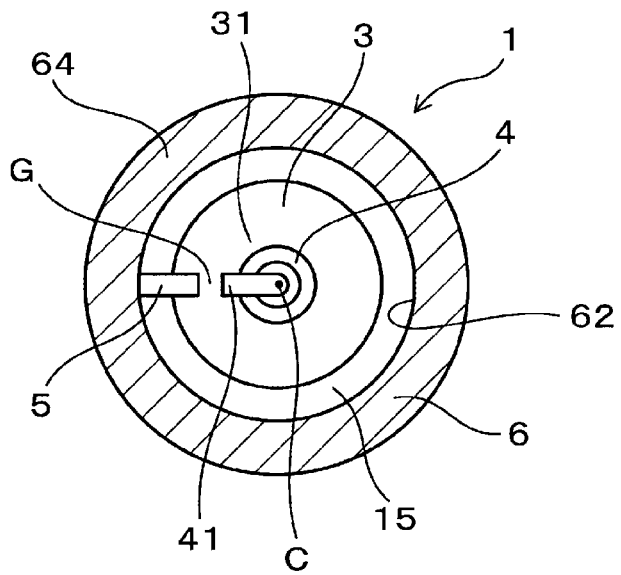
FIG. 2 is a cross-sectional diagram view taken along a line II-II in FIG. 1.

A spark plug 1 of the present embodiment includes a cylindrical housing 2, a cylindrical insulator 3, a center electrode 4, a ground electrode 5, and an auxiliary chamber forming portion 6 as illustrated in FIG. 1 and FIG. 2.

The insulator 3 is held inside the housing 2. The center electrode 4 is held inside the insulator 3 and projects on a distal end side of the insulator 3. The ground electrode 5 faces the center electrode 4 from an outer peripheral side and forms a discharge gap G between the ground electrode 5 and the center electrode 4. The auxiliary chamber forming portion 6 is provided at a distal end portion of the housing 2.

Figure 3:
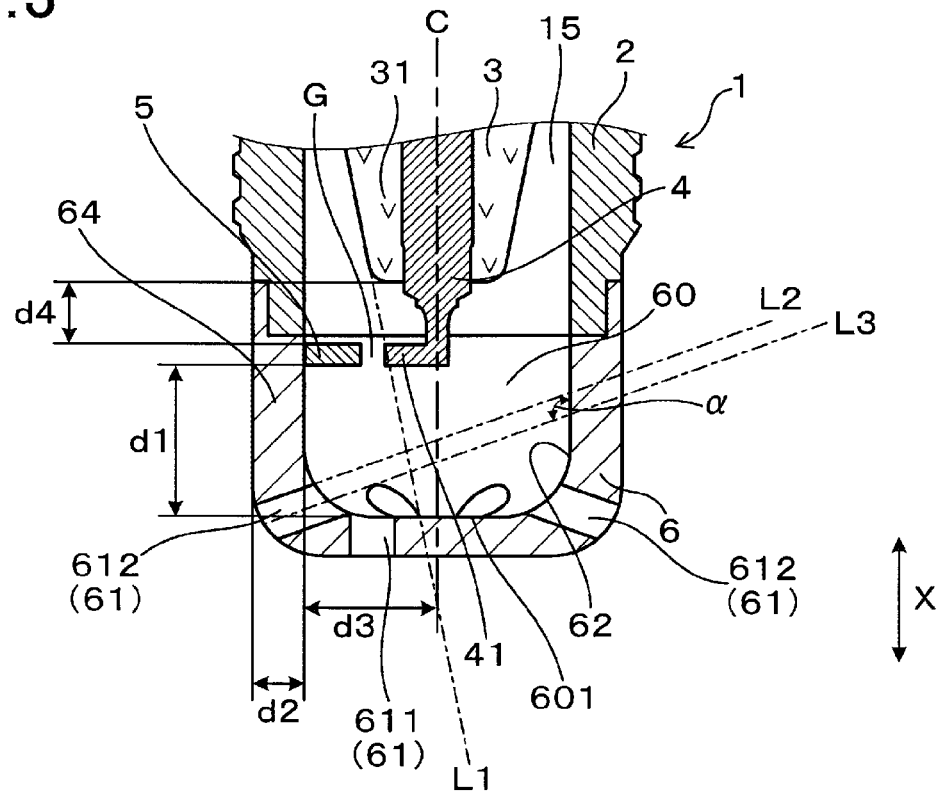
FIG. 3 is a cross-sectional diagram for explaining the distal end portion of the spark plug for explaining a dimension relationship of each portion in the first embodiment.

Inside the auxiliary chamber forming portion 6, an auxiliary chamber 60 in which the discharge gap G is to be disposed is formed. As illustrated in FIG. 3, a distance d1 in an axial direction between the discharge gap G and a distal end 601 of the auxiliary chamber 60 is equal to or greater than a maximum wall thickness d2 of the auxiliary chamber forming portion 6. The auxiliary chamber forming portion 6 includes injection holes 61 through which the auxiliary chamber 60 is communicated with outside of the auxiliary chamber forming portion 6. As illustrated in FIG. 1, the injection holes 61 are formed in a state where openings 614 on an outer side are located closer to the distal end than openings 613 on the auxiliary chamber 60 side are.

Figure 4:
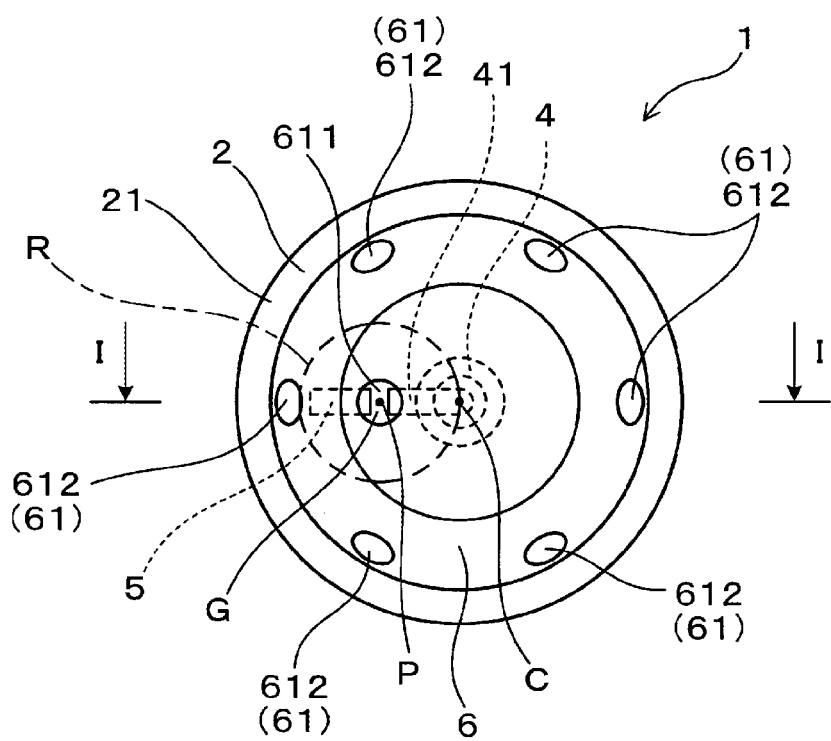
FIG. 4 is a plan view viewed in a direction of an arrow IV in FIG. 1.

At least one of the injection holes 61 is an injection hole 611 in an axial direction formed along an axial direction of a spark plug X. As illustrated in FIG. 4, when viewed in the axial direction of the spark plug X, a center P of the injection hole 611 in the axial direction is eccentric on the discharge gap G side from a plug center axis C.

It is assumed in the present specification that the spark plug center axis C means the center axis C of the spark plug 1. Further, a direction parallel to the spark plug center axis C will be referred to as an axial direction of the spark plug or an X direction as appropriate. Further, in the X direction, a side facing the main combustion chamber 7 in the spark plug 1 will be referred to as a distal end side, and the opposite side will be referred to as a proximal end side.

In the present embodiment, as illustrated in FIG. 1 and FIG. 4, the auxiliary chamber forming portion 6 includes a plurality of injection holes 61. Further, the auxiliary chamber forming portion 6 includes a plurality of oblique injection holes 612 in addition to the injection hole 611 in the axial direction as the injection holes 61. The oblique injection holes 612 are injection holes 61 oblique so as to be away from the spark plug center axis C toward the distal end. The injection hole 611 in the axial direction is formed at a position closer to the spark plug center axis C than the oblique injection holes 612 are.

Further, as illustrated in FIG. 4, the injection hole 611 in the axial direction is formed so as to have a center at the center of the discharge gap G and so as to be inside of a virtual circle R with a radius of a distance from the center of the discharge gap G to the spark plug center axis C when the spark plug 1 is viewed from the distal end side.

Further, when viewed in the axial direction of the spark plug X, the discharge gap G and the injection hole 611 in the axial direction at least partially overlap with each other. In the present embodiment, a positional relationship is such that when viewed in the axial direction of the spark plug X, the center P of the injection hole 611 in the axial direction is disposed at the discharge gap G.

As illustrated in FIG. 1 and FIG. 2, the center electrode 4 includes an electrode projecting portion 41 projecting outward in a radial direction. The discharge gap G is formed between the ground electrode 5 disposed so as to face an end edge on a projecting side of the electrode projecting portion 41 and the electrode projecting portion 41. The ground electrode 5 is formed so as to project inward in the radial direction from an inner wall surface 62 of the auxiliary chamber forming portion 6. A projecting end of the ground electrode 5 and a projecting end of the electrode projecting portion 41 face each other. Further, the discharge gap G is formed between the projecting end of the ground electrode 5 and the projecting end of the electrode projecting portion 41.

Note that the radial direction is a direction orthogonal to the spark plug center axis C.

At least part of the electrode projecting portion 41 can be constituted with a noble metal. In this case, a noble metal is preferably disposed in at least a portion facing the discharge gap G among the electrode projecting portion 41. Further, at least part of the ground electrode 5 can also be constituted with a noble metal. In this case, a noble metal is preferably disposed at least at a portion facing the discharge gap G, of the ground electrode 5.

As illustrated in FIG. 1, the auxiliary chamber forming portion 6 includes a bottom wall portion 63, a peripheral wall portion 64 and a corner portion 65. The bottom wall portion 63 is a portion covering a distal end side of the auxiliary chamber 60. The peripheral wall portion 64 is a portion having a substantially cylindrical shape covering an outer peripheral side of the auxiliary chamber 60. The corner portion 65 is a portion that couples an outer periphery of the bottom wall portion 63 and a distal end of the periphery wall portion 64 in a curved shape.

Note that the shape of the auxiliary chamber forming portion 6 is not particularly limited, and, for example, may have a shape such as a substantially hemispherical shape with no distinction among the bottom wall portion 63, the periphery wall portion 64 and the corner portion 65.

The oblique injection holes 612 are formed at the corner portion 65. The injection hole 611 in the axial direction is formed in the bottom wall portion 63. In the present embodiment, the auxiliary chamber forming portion 6 includes six oblique injecting holes 612 and one injection hole 611 in the axial direction. As illustrated in FIG. 3, each oblique injection hole 612 is oblique toward a proximal end from outside toward inside. When extending a center axis of each oblique injection hole 612, an extension line L3 intersects with the inner wall surface 62 on an opposite side in the auxiliary chamber 60. At an intersecting point, an angle α on the proximal end side among angles formed by the extension line L3 and the inner wall surface 62 is an angle exceeding 90°, that is, an obtuse angle.

The insulator 3 includes a tapered distal end portion 31 having a radius decreasing toward the distal end. As illustrated in FIG. 3, on a cross-section in a plane including the spark plug center axis C and passing through the discharge gap G, the discharge gap G is formed at a position farther from the spark plug center axis C than an extension line L1 of an outer periphery surface of the tapered distal end portion 31.

On the cross-section in the plane including the spark plug center axis C and passing through the discharge gap G, the injection hole 611 in the axial direction is formed at a position farther from the spark plug center axis C than the extension line L1 is.

As illustrated in FIG. 1, the auxiliary chamber forming portion 6 is disposed so as to cover the distal end portion of the cylindrical housing 2. Further, a pocket portion 15 that is circular space is formed between the housing 2 and the tapered distal end portion 31 of the insulator 3. In other words, the insulator 3 is locked at a part of the inner periphery surface of the housing 2 in a part of the outer periphery surface of the insulator 3 (not illustrated). A portion of the insulator 3 closer to the distal end than the locking portion is, is the tapered distal end portion 31. The pocket portion 15 is formed between an outer surface of the tapered distal end portion 31 and an inner surface of the housing 2. The auxiliary chamber 60 that is a space inside the auxiliary chamber forming portion 6 and the pocket portion 15 are communicated with each other.

Note that the auxiliary chamber 60 includes a space on an inner periphery side of the distal end portion of the housing 2 around the center electrode 4. Thus, the inner wall surface 62 of the auxiliary chamber 60 includes an inner surface of the distal end portion of the housing 2 in addition to the inner surface of the auxiliary chamber forming portion 6.

As illustrated in FIG. 3, the discharge gap G is disposed closer to a proximal end than an extension line L2 of a proximal end surface of the oblique injection hole 612 is. Here, the extension line L2 of the proximal end surface of the oblique injection hole 612 is a line in contact with the proximal end surface of the oblique injection hole 612 among lines along the central axis of the oblique injection hole 612.

In the present embodiment, the ground electrode 5 projects from a position in the axial direction of the spark plug, closer to the proximal end portion than the injection hole 61 in the auxiliary chamber forming portion 6 is.

Further, in the present embodiment, a distance d1 in the axial direction between the discharge gap G and the distal end 601 of the auxiliary chamber 60 is greater than a maximum wall thickness d2 of the auxiliary chamber forming portion 6. Further, the distance d1 in the axial direction is greater than a distance d4 in the axial direction between a distal end of the insulator 3 and the discharge gap G. Further, the distance d1 in the axial direction is greater than a radius d3 of the auxiliary chamber 60. Here, the radius d3 means a radius in a cross-section having the greatest radius among cross-sections orthogonal in the X direction in the auxiliary chamber 60.

Figure 5:
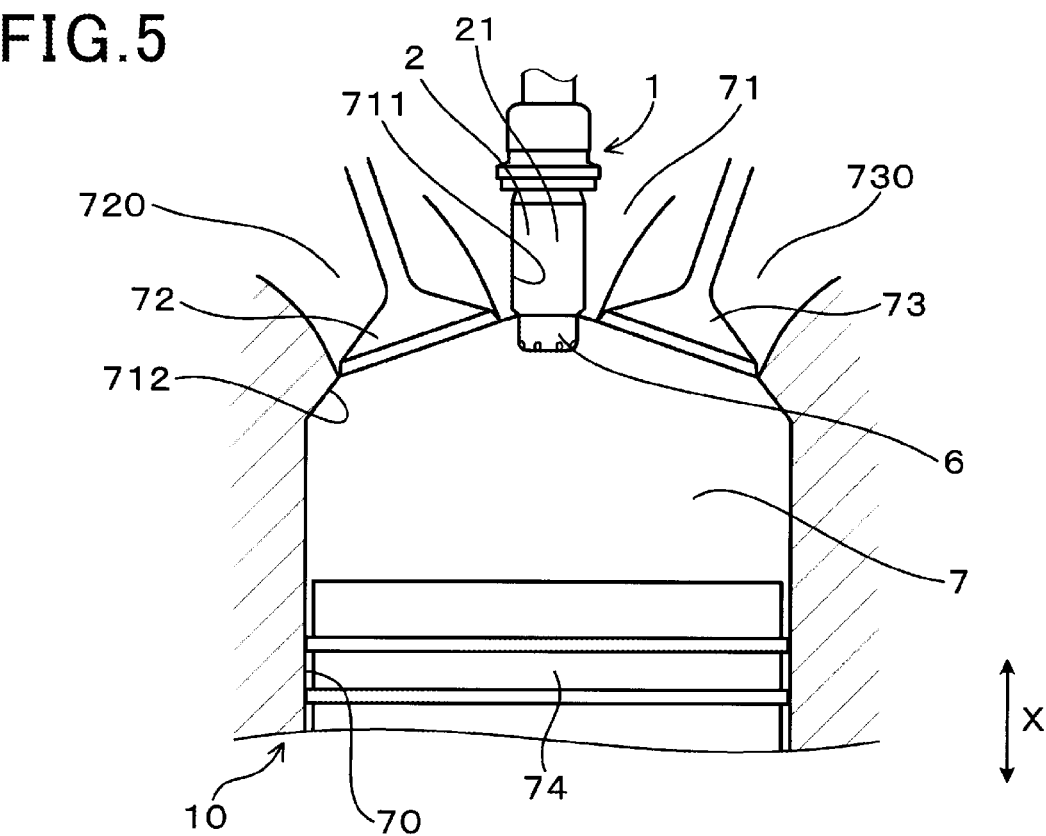
FIG. 5 is a cross-sectional diagram for explaining an internal combustion engine including the spark plug in the first embodiment.

By attaching the spark plug 1 having the configuration as described above to a cylinder head 71, or the like, an internal combustion engine 10 as illustrated in FIG. 5 can be obtained. As illustrated in FIG. 5, the internal combustion engine 10 includes an inlet valve 72 that opens/closes an inlet port 720 and an exhaust valve 73 that opens/closes an exhaust port 730.

Figure 6:
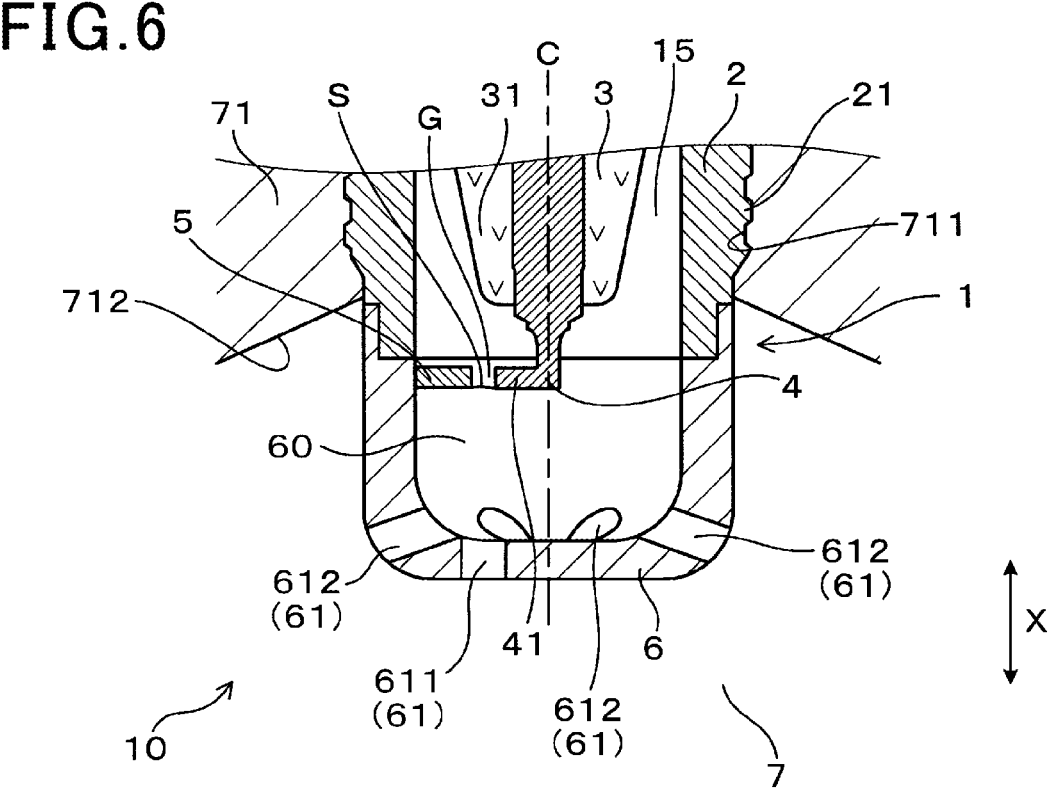
FIG. 6 is a cross-sectional diagram for explaining the internal combustion engine indicating an aspect immediately after a spark discharge is formed, in the first embodiment.
Figure 7:
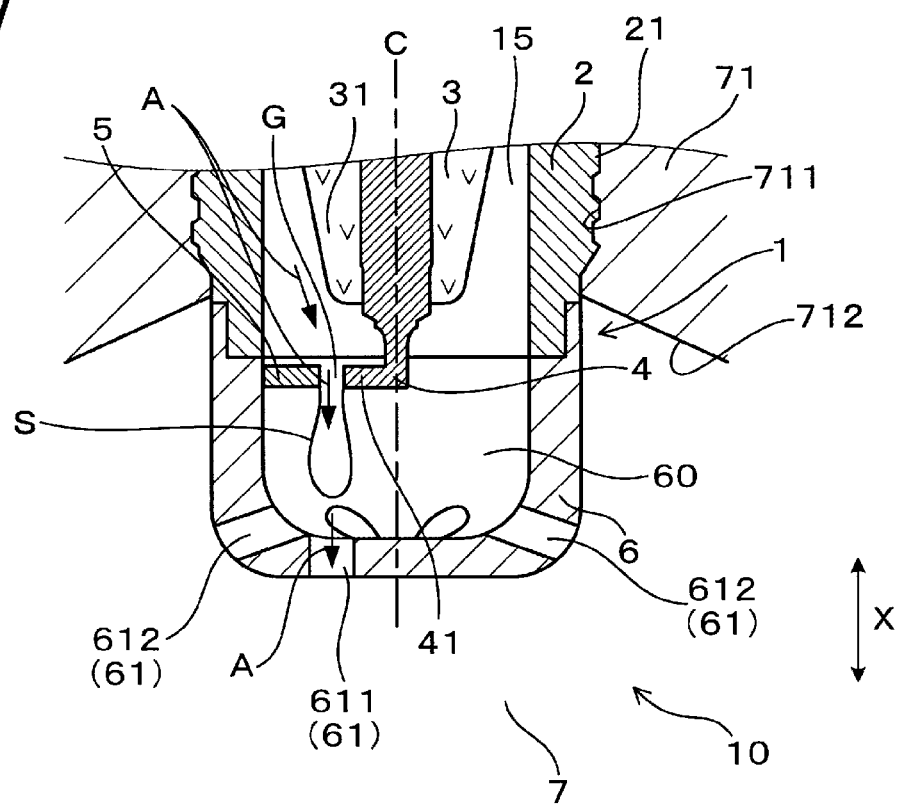
FIG. 7 is a cross-sectional diagram for explaining the internal combustion engine indicating an aspect where a spark discharge extends, in the first embodiment.

As illustrated in FIG. 5 to FIG. 7, the spark plug 1 is attached to the internal combustion engine 10 by a mounting screw portion 21 of the housing 2 being screwed into a female screw hole 711 provided at the cylinder head 71. For example, by adjusting a cutting process of the screw of the mounting screw portion 21, a cutting process of the female screw hole 711, or the like, a mounting posture of the spark plug 1 in the internal combustion engine 10 can be adjusted.

In the present embodiment, the spark plug 1 is assembled to the cylinder head 71 of the internal combustion engine 10 at such a posture that the discharge gap G and the injection hole 611 in the axial direction are disposed closer to the inlet valve 72 than the spark plug center axis C is.

The distal end portion of the spark plug 1 is made to project to the main combustion chamber 7. In other words, the auxiliary chamber forming portion 6 is exposed to the main combustion chamber 7, and the injection holes 61 are exposed to the main combustion chamber 7. As illustrated in FIG. 5, a piston 74 is slidably disposed in a cylinder 70 that constitutes the main combustion chamber 7.

Further, as illustrated in FIG. 5 to FIG. 7, a proximal end surface 712 of the main combustion chamber 7 is oblique toward the distal end as the proximal end surface 712 is farther from the spark plug 1.

In the internal combustion engine 10, an inlet stroke, a compression stroke, an expansion stroke and an exhaust stroke are sequentially repeated in accordance with reciprocating movement of the piston 74. In the inlet stroke, a gas is introduced from the inlet port 720 into the main combustion chamber 7, and in the exhaust stroke, a gas inside the main combustion chamber 7 is discharged from the exhaust port 730.

Further, in the expansion stroke, as a result of the piston 74 moving on the distal end side, a pressure of the main combustion chamber 7 becomes negative with respect to a pressure of the auxiliary chamber 60. Further, as illustrated in FIG. 7, an air flow A from the auxiliary chamber 60 toward the main combustion chamber 7 through the injection holes 61 is formed in the auxiliary chamber 60.

Operational effects of the present embodiment will be described next.

In the above-described spark plug 1, the auxiliary chamber forming portion 6 includes the injection hole 611 in the axial direction. Further, as illustrated in FIG. 4, when viewed in the axial direction of the spark plug X, the center P of the injection hole 611 in the axial direction is eccentric on the discharge gap G side from the spark plug center axis C. This makes it easy to form a strong air flow toward the distal end in the axial direction at the discharge gap G in the expansion stroke of the internal combustion engine 10. Thus, as illustrated in FIG. 6, the spark discharge S formed at the discharge gap G is likely to largely extend on the distal end side in the auxiliary chamber 60 as illustrated in FIG. 7.

An ignition timing of the spark plug 1 may be set at an early stage of the expansion stroke. For example, upon start of an engine, or the like, ignition may be performed in an early stage of the expansion stroke immediately after the piston passes through a top dead center for the purpose of increasing a catalyst temperature in an exhaust gas purification filter provided in an exhaust system. In such a case, a pressure of the main combustion chamber 7 becomes negative with respect to a pressure of the auxiliary chamber 60 at a time point at which the spark discharge S is formed, which makes it easier to form an air flow from the auxiliary chamber 60 toward the main combustion chamber 7.

Here, in the spark plug 1 in the present embodiment, the auxiliary chamber forming portion 6 includes the injection hole 611 in the axial direction. Thus, as illustrated in FIG. 7, an air flow A toward the distal end is generated in the auxiliary chamber 60, which makes it easier to generate the air flow A toward the distal end side also at the discharge gap G.

Thus, the spark discharge S generated in the early stage of the expansion stroke is likely to extend on the distal end side in the auxiliary chamber 60. This can improve ignition performance of an air-fuel mixture in the auxiliary chamber 60, which results in making it possible to strengthen ejection of a flame to the main combustion chamber 7.

Further, the auxiliary chamber forming portion 6 includes the oblique injection holes 612 in addition to the injection hole 611 in the axial direction as the injection holes 61. Further, the injection hole 611 in the axial direction is formed at a position closer to the spark plug center axis C than the oblique injection holes 612. This enables the flame formed in the auxiliary chamber 60 to be ejected in a plurality of directions that are different from each other. Further, this enables the flame to be ejected in a large region in the main combustion chamber 7. This results in making it possible to further improve ignition performance in the main combustion chamber 7.

The discharge gap G and the injection hole 611 in the axial direction at least partially overlap with each other when viewed in the axial direction of the spark plug X. This makes it easier to make the air flow A from the discharge gap G toward the injection hole 611 in the axial direction along the axial direction X. This makes it easier to extend the spark discharge S more effectively.

The center electrode 4 includes an electrode projecting portion 41. This makes it easy to dispose the discharge gap G at an appropriate position. In other words, the discharge gap G can be easily formed at a position appropriately far from the spark plug center axis C. This results in making it easier to effectively extend the spark discharge S formed at the discharge gap G.

Further, on a cross-section in a plane including the spark plug center axis C and passing through the discharge gap G, the discharge gap G is formed at a position farther from the spark plug center axis C than the extension line L1 of the outer periphery surface of the tapered distal end portion 31. This makes it possible to extend the spark discharge S more effectively to the distal end side. In other words, the air flow A flowing from the pocket portion 15 to the auxiliary chamber 60 is likely to be strong at a position farther from the spark plug center axis C than the extension line L1. Thus, by forming the discharge gap G closer to the outer periphery than the extension line L1, the spark discharge S is likely to extend more effectively.

Further, the injection hole 611 in the axial direction is formed at a position farther from the spark plug center axis C than the extension line L1. This makes it possible to further more effectively extend the spark discharge S to the distal end side. In other words, as a result of the injection hole 611 in the axial direction existing closer to the outer periphery than the extension line L1, the air flow A is likely to be a strong air flow. This results in making it easier to extend the spark discharge S more effectively.

The distance d1 in the axial direction between the discharge gap G and the distal end 601 of the auxiliary chamber 60 is equal to or greater than the maximum wall thickness d2 of the auxiliary chamber forming portion 6. This can secure space in which the spark discharge S extends to the distal end side in the auxiliary chamber 60.

Further, the spark discharge S extended by the air flow A can ignite an air-fuel mixture located at a position close to the injection hole 611 in the axial direction in the auxiliary chamber 60. Thus, a flame formed in the auxiliary chamber 60 by the spark discharge S can be promptly ejected to the main combustion chamber 7 by passing through the injection hole 611 in the axial direction before passing through the oblique injection holes 612. This results in making it possible to ignite an air-fuel mixture in the main combustion chamber 7 promptly and reliably while reducing a cooling loss due to contact between the flame and the auxiliary chamber forming portion 6, or the like, occurring by the flame remaining in the auxiliary chamber 60.

As described above, according to the present embodiment, it is possible to provide the spark plug 1 for the internal combustion engine with excellent ignition performance.

First Comparative Embodiment

Figure 8:
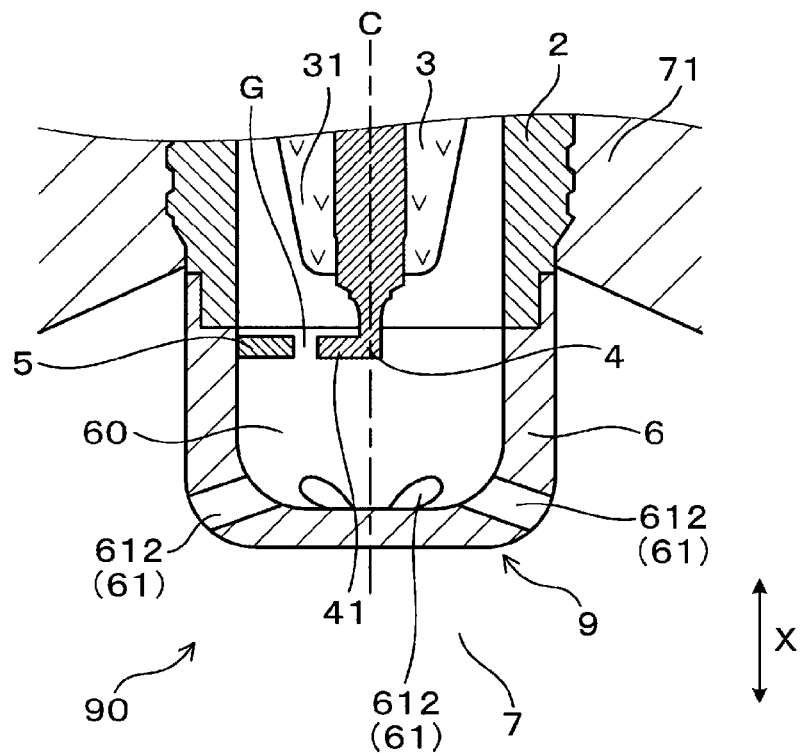
FIG. 8 is a cross-sectional diagram for explaining a distal end portion of a spark plug in a first comparative embodiment.

As illustrated in FIG. 8, a spark plug 9 of the present embodiment does not include the injection hole 611 in the axial direction.

The comparative embodiment is similar to A first embodiment in other points. Note that reference numerals that are the same as those used in A first embodiment among the reference numerals used in FIG. 8 indicate components, and the like, that are similar to those in A first embodiment.

First Experimental Example

In the present example, as illustrated in FIG. 9 to FIG. 12, an air flow in the auxiliary chamber 60 is analyzed for the spark plug 1 of A first embodiment and the spark plug 9 of a first comparative embodiment.

The air flow is analyzed by performing calculation using computational fluid dynamics (hereinafter, referred to as CFD). In other words, in internal combustion engines in which the spark plug in A first embodiment and the spark plug in a first comparative embodiment are respectively attached, typical simulation analysis is performed by CFD assuming air flows generated when the internal combustion engines are used as automobile engines.

FIG. 9 to FIG. 12 illustrate analysis results at a time point of ATDC (After compression Top Dead Center) 30° CA (Crank Angle) in an expansion stroke. In these drawings, each of a number of arrows indicates a direction of the air flow at each position.

Figure 9:
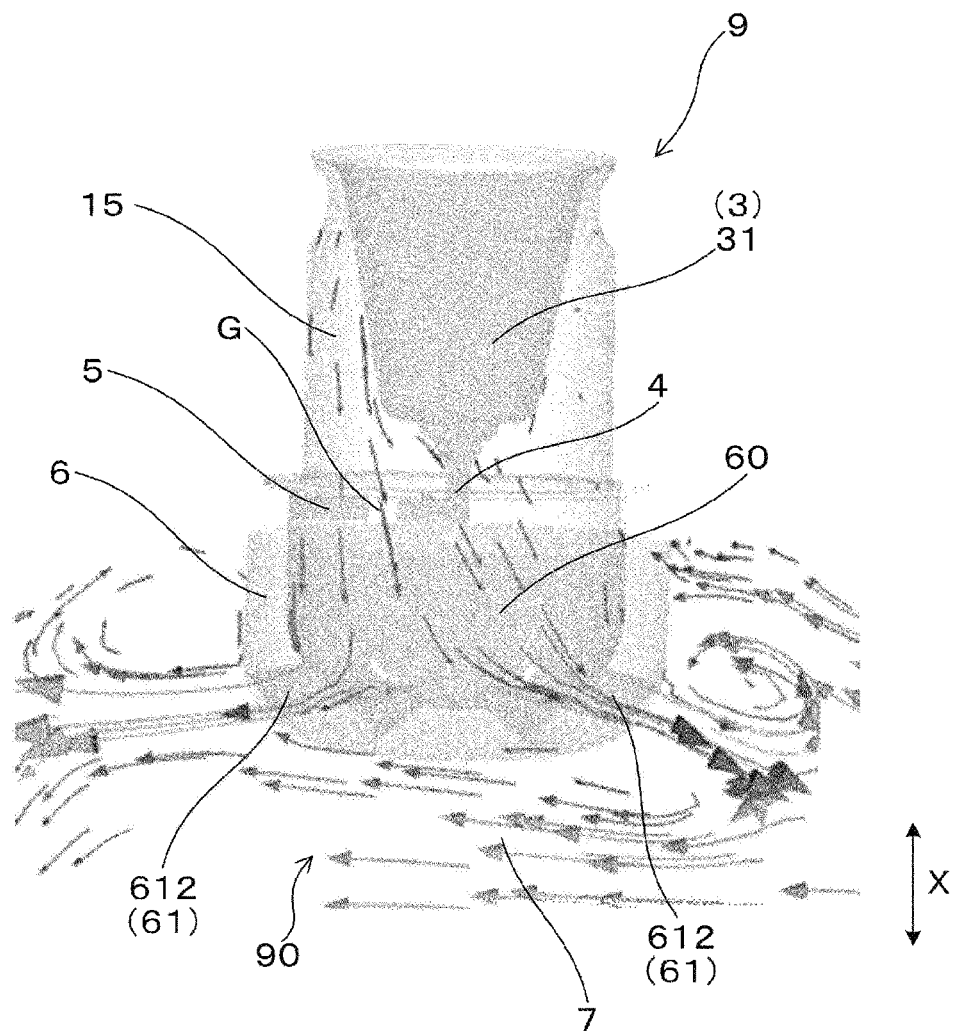
FIG. 9 is a CFD analysis diagram in an expansion stroke of an internal combustion engine in which the spark plug in the first comparative embodiment is attached so that a discharge gap is located on an inlet valve side in a first experimental example.

FIG. 9 illustrates an analysis result when the spark plug 9 in a first comparative embodiment is assembled to the cylinder head 71 of the internal combustion engine 90 at such a posture that the discharge gap G is disposed closer to the inlet valve 72 than the spark plug center axis C is. Hereinafter, this analysis result will be referred to as analysis result 1.

Figure 10:
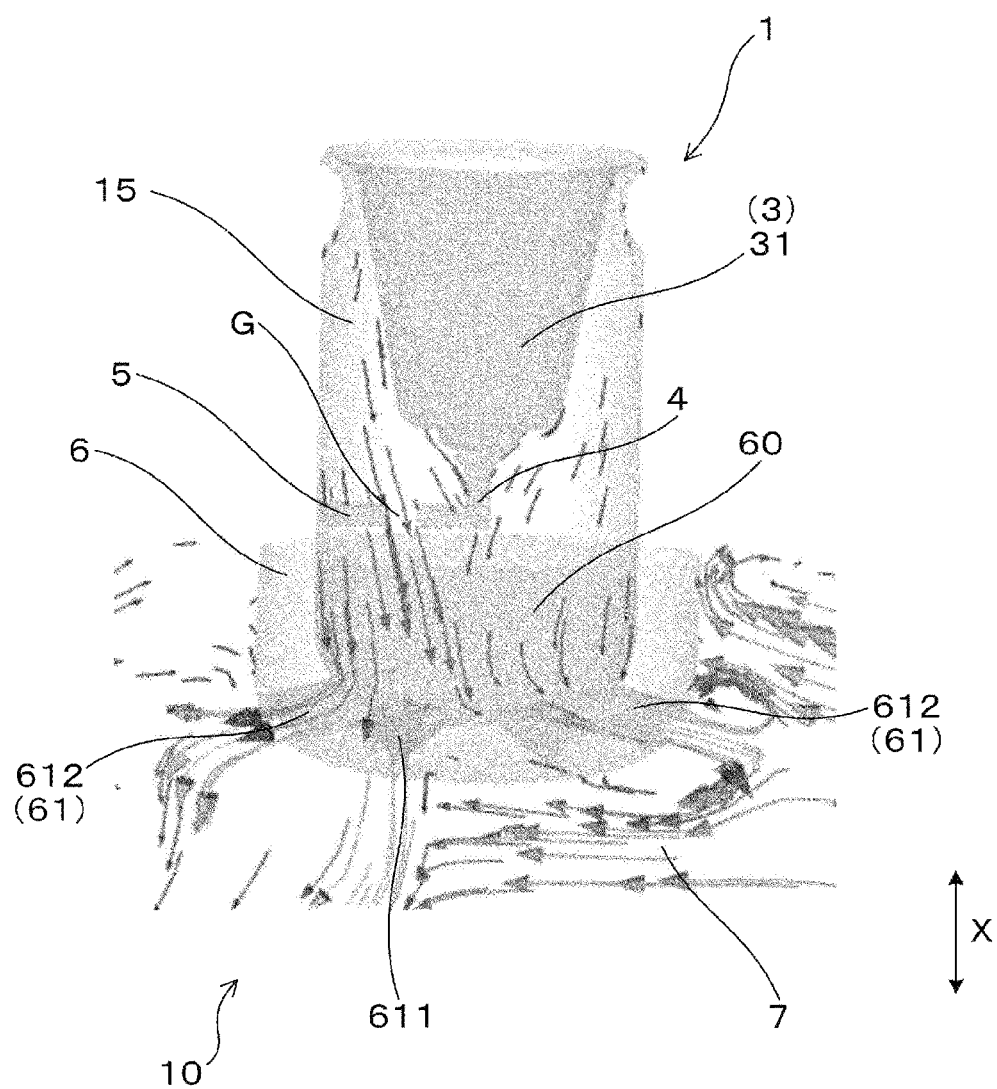
FIG. 10 is a CFD analysis diagram in an expansion stroke of an internal combustion engine in which the spark plug of the first embodiment is attached so that a discharge gap and an injection hole in an axial direction are located on an inlet valve side in the first experimental example.

FIG. 10 illustrates an analysis result when the spark plug 1 in A first embodiment is assembled to the cylinder head 71 of the internal combustion engine 10 at such a posture that the discharge gap G and the injection hole 611 in the axial direction are disposed closer to the inlet valve 72 than the spark plug center axis C is. Hereinafter, this analysis result will be referred to as analysis result 2.

Figure 11:
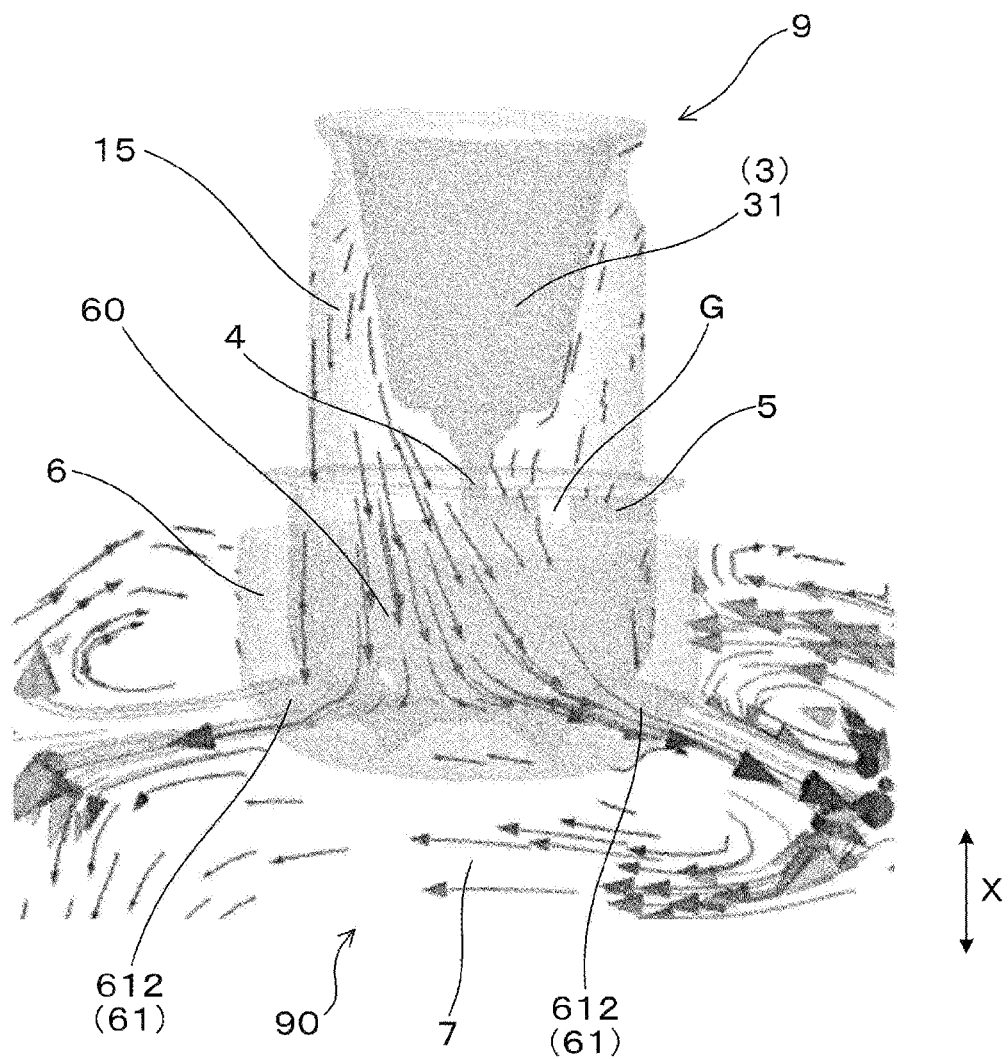
FIG. 11 is a CFD analysis diagram in an expansion stroke of an internal combustion engine in which the spark plug of the first comparative embodiment is attached so that the discharge gap is located on an exhaust valve side in the first experimental example.

FIG. 11 illustrates an analysis result when the spark plug 9 in a first comparative embodiment is assembled to the cylinder head 71 of the internal combustion engine 90 at such a posture that the discharge gap G is disposed closer to the exhaust valve 73 than the spark plug center axis C is. Hereinafter, this analysis result will be referred to as analysis result 3.

Figure 12:
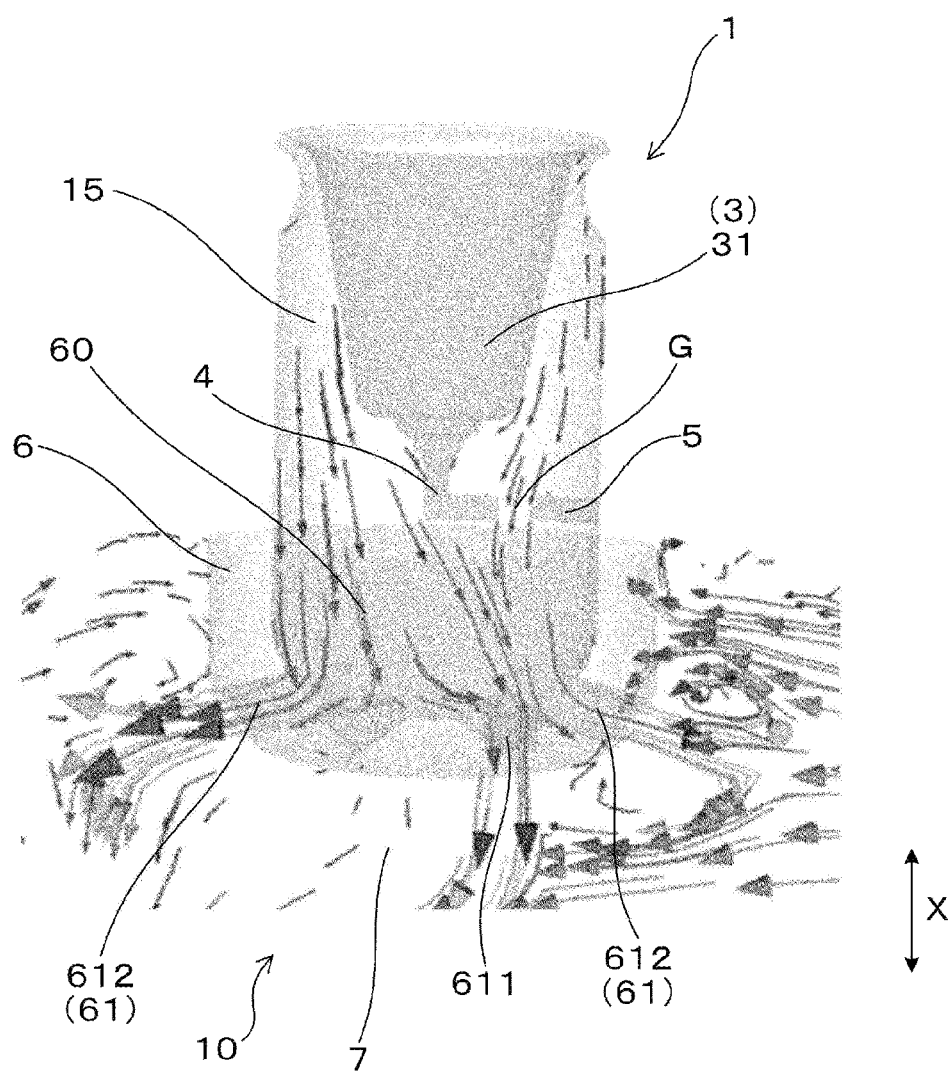
FIG. 12 is a CFD analysis diagram in an expansion stroke of an internal combustion engine in which the spark plug of the first embodiment is attached so that the discharge gap and the axial injection hole are located on an exhaust valve side in the first experimental example.

Further, FIG. 12 illustrates an analysis result when the spark plug 1 in A first embodiment is assembled to the cylinder head 71 of the internal combustion engine 10 at such a posture that the discharge gap G and the injection hole 611 in the axial direction are disposed closer to the exhaust valve 73 than the spark plug center axis C is. Hereinafter, this analysis result will be referred to as analysis result 4.

As illustrated in FIG. 9 to FIG. 12, it has been confirmed that in all the analysis results, the air flow in the auxiliary chamber 60 in the expansion stroke flows from the proximal end side to the distal end side, passes through the injection holes 61 and flows to the main combustion chamber 7. Further, a stronger air flow toward the distal end is generated at the discharge gap G in analysis result 2 illustrated in FIG. 10 than in analysis result 1 illustrated in FIG. 9. Thus, it can be considered that in A first embodiment, the spark discharge S generated at the discharge gap G is more likely to extend to the distal end side in the expansion stroke than in a first comparative embodiment.

Further, a stronger air flow toward the distal end is generated near the discharge gap G in analysis result 4 illustrated in FIG. 12 than in analysis result 3 illustrated in FIG. 11. Thus, also in a case where the discharge gap G is disposed on the exhaust valve 73 side, it can be considered that the spark discharge is more likely to extend to the distal end side in the axial direction in a case where the injection hole 611 in the axial direction is eccentric on the discharge gap G side.

Second Experimental Example

Figure 13:
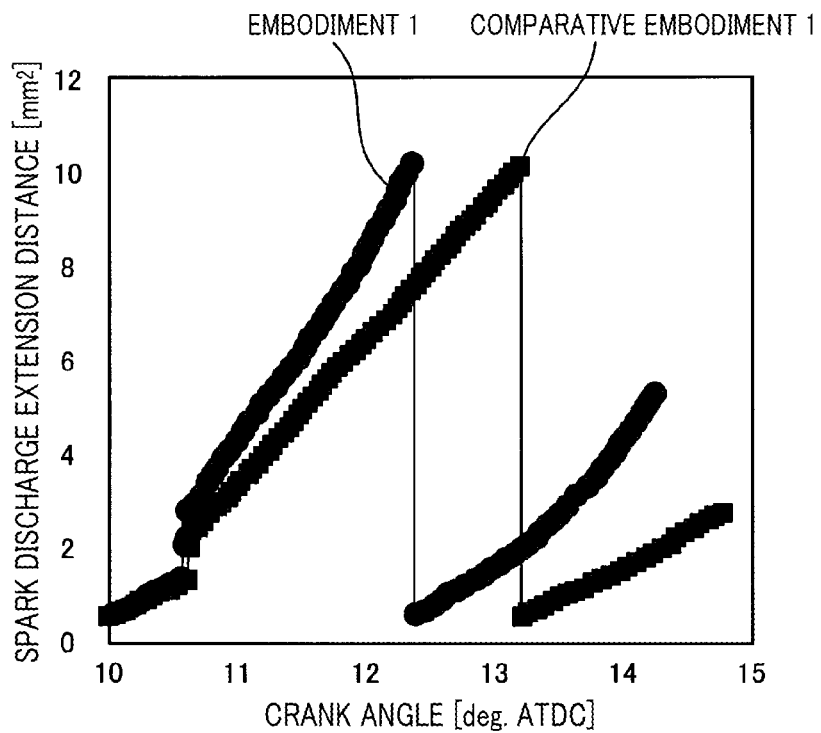
FIG. 13 is a graph indicating transition of a spark discharge extension distance over time in a second experimental example.

The present example is an example where effects of extension of the spark discharge in the spark plug 1 in A first embodiment and the spark plug 9 in a first comparative embodiment are analyzed by CFD as indicated in FIG. 13.

Test conditions are such that a four-cylinder engine of 2 L is assumed as an internal combustion engine, rotation speed is 1200 rpm, load is 150 kPa, and an air-fuel ratio (that is, A/F) is 14.7. Further, a size of the discharge gap G of each spark plug is set at 0.7 mm, a diameter of the injection hole 61 is set at 1.2 mm, a volume of the auxiliary chamber 60 is set at 0.4 cc, and an ignition timing of the spark discharge S is set at ATDC10° CA.

Under the conditions, a voltage is applied to each spark plug to generate the spark discharge S at the discharge gap G. The result is indicated in FIG. 13. As can be seen from the drawing, it could be confirmed that the spark discharge S extends more promptly in the spark plug 1 in A first embodiment than in a first comparative embodiment.

Second Comparative Embodiment

Figure 14:
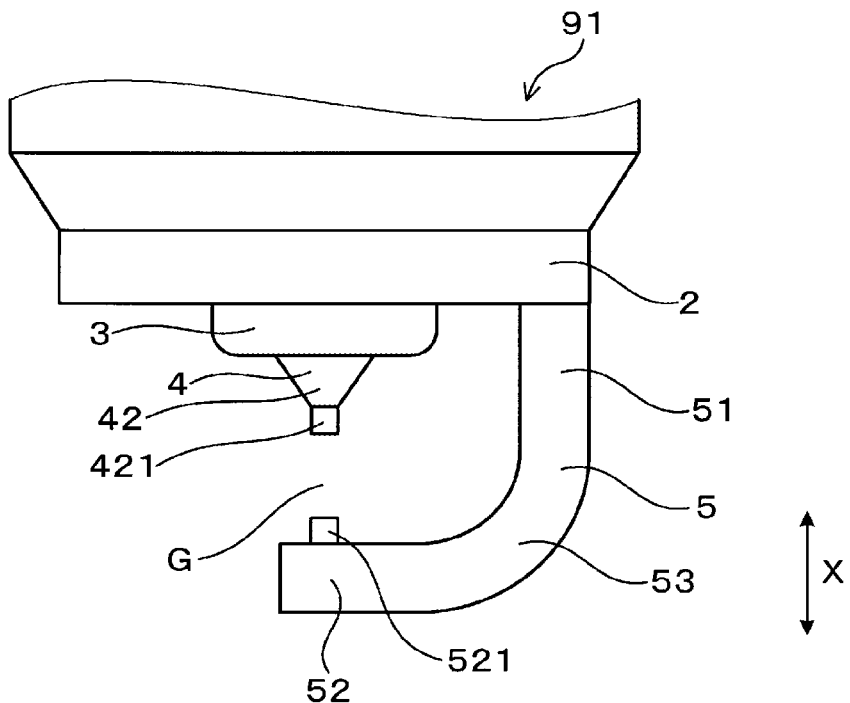
FIG. 14 is a plan view of a distal portion of a spark plug in a second comparative embodiment.

As illustrated in FIG. 14, a spark plug 91 in the present embodiment does not include the auxiliary chamber 60.

In the present embodiment, the ground electrode 5 includes an erecting portion 51 that is connected to the distal end portion of the housing 2 and formed along the X direction as illustrated in FIG. 14. Further, the ground electrode 5 includes a facing portion 52 that faces the center electrode 4 in the X direction and a bending portion 53 that connects the erecting portion 51 and the facing portion 52.

A ground side chip 521 is attached to the facing portion 52. The ground electrode 5 in the present embodiment is formed in a substantially L shape.

The center electrode 4 includes a reduced diameter portion 42 projecting from the insulator 3 to the distal end side. The reduced diameter portion 42 is formed so that a diameter decreases toward the distal end. Further, an electrode side chip 421 is attached at a distal end of the reduced diameter portion 42. Further, the discharge gap G is formed between the ground side chip 521 of the facing portion 52 and the electrode side chip 421 of the center electrode 4. The electrode side chip 421 and the ground side chip 521 are, for example, formed with platinum (that is, Pt), or the like, in a columnar shape.

Further, the spark plug 91 in the present embodiment does not include the auxiliary chamber forming portion 6 that forms the auxiliar chamber 60. Thus, when the spark plug 91 of the present embodiment is attached to the internal combustion engine, the discharge gap G is disposed in a state where the discharge gap G is exposed to the main combustion chamber 7.

The present embodiment is similar to A first embodiment in other points.

Third Experimental Example

As illustrated in FIG. 15 to FIG. 18, in the present example, development of the flame F in the main combustion chamber 7 is analyzed by CFD for the spark plug 1 in the first embodiment, the spark plug 9 in a first comparative embodiment and the spark plug 91 in comparative a second embodiment.

Test conditions are similar to those in the second experimental example.

Figure 15B:
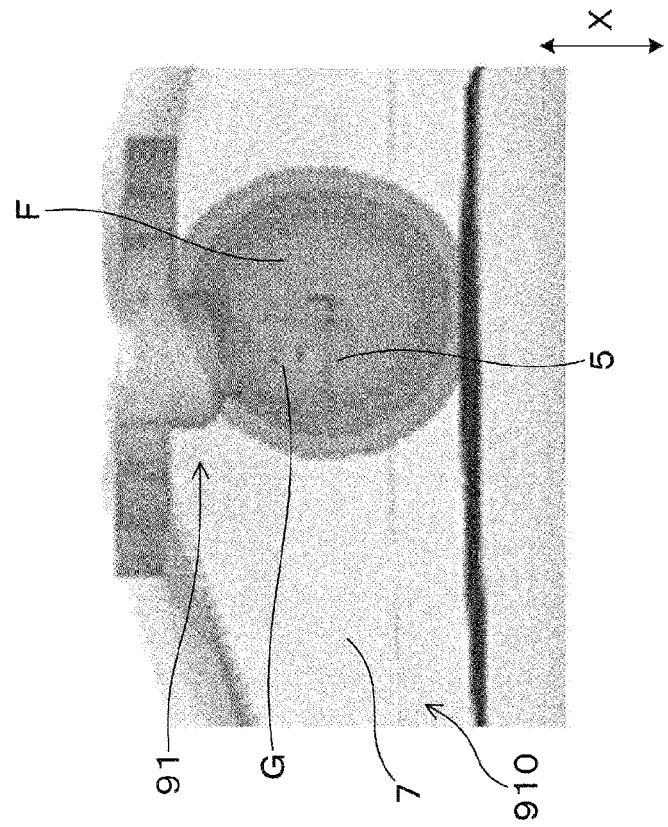
FIG. 15A and FIG. 15B are CFD analysis diagrams of a flame of an internal combustion engine in which the spark plug of the second comparative embodiment is attached in a third experimental example.
Figure 15A:
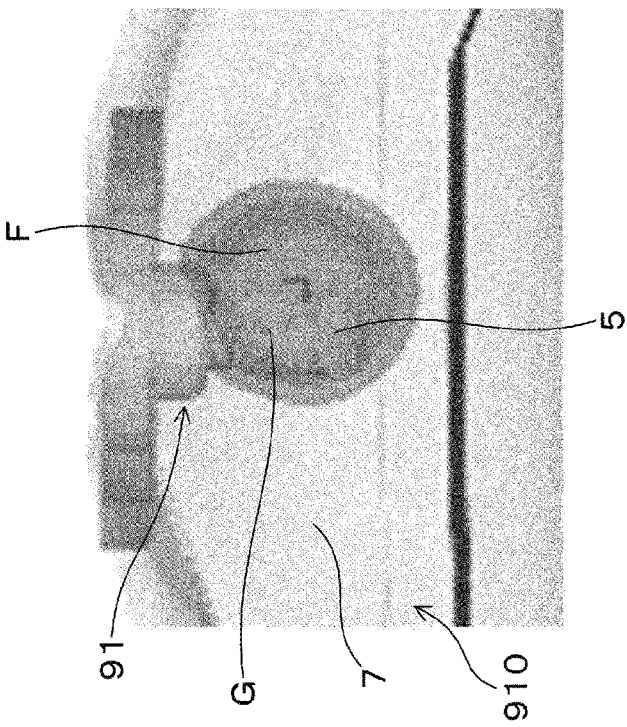
Figure 17A:
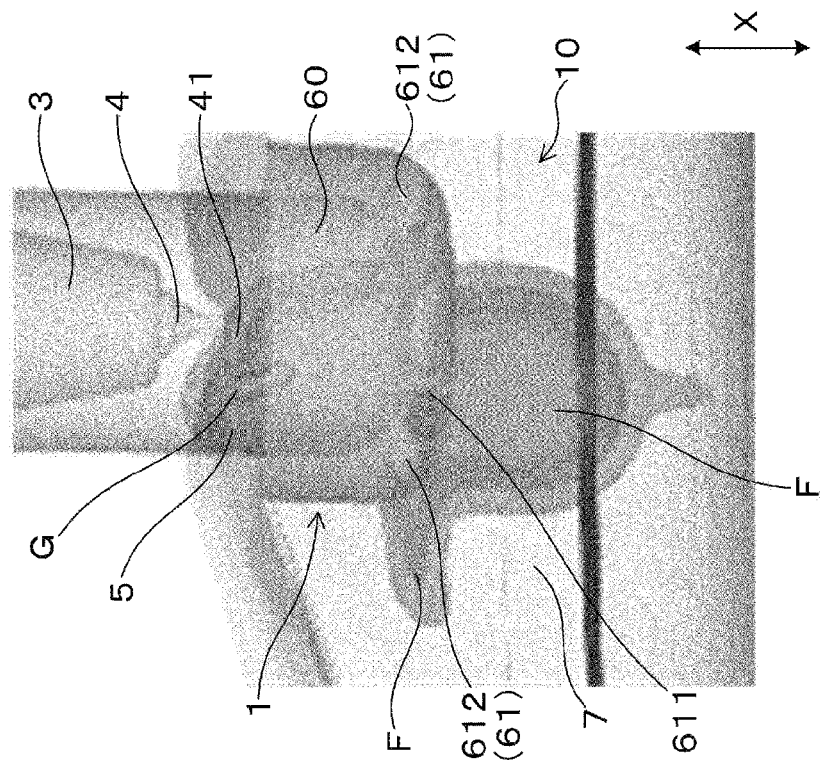
FIG. 17A and FIG. 17B are CFD analysis diagrams of a flame of an internal combustion engine in which the spark plug of the first embodiment is attached in the third experimental example.
Figure 17B:
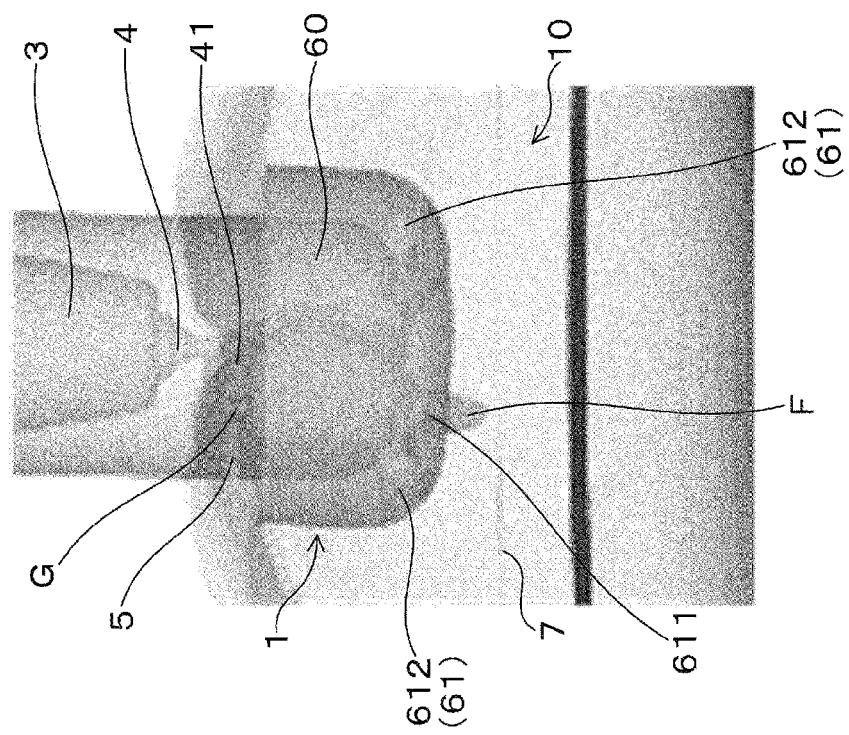

FIG. 15 illustrates an analysis result of comparative a second embodiment, FIG. 16 illustrates an analysis result of a first comparative embodiment, and FIG. 17 illustrates an analysis result of A first embodiment. Further, FIG. 15A, FIG. 16A and FIG. 17A illustrate conditions of the flame at a time point of ATDC 13° CA when 3° CA has elapsed from ignition, and FIG. 15B, FIG. 16B and FIG. 17B illustrate conditions of the flame at a time point of ATDC 14° CA.

Figure 18:
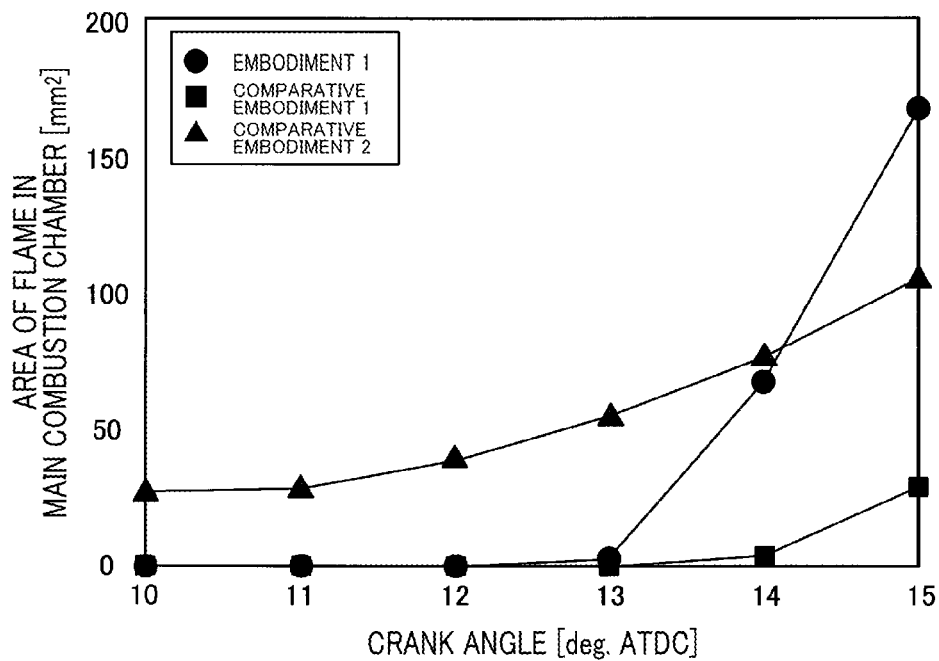
FIG. 18 is a graph indicating transition of a size of a flame in a main combustion chamber over time in the internal combustion engine in which each spark plug is attached in the third experimental example.

FIG. 18 is a graph indicating a relationship between a size of the flame in the main combustion chamber and an elapsed time period from ignition of the spark discharge in each spark plug. In the drawing, the elapsed time period is indicated by change of a crank angle. An area of the flame in the main combustion chamber in FIG. 18 is indicated as an area (mm$^2$) by indicating a size of the flame when the internal combustion engine is indicated as a two-dimensional drawing as illustrated in FIG. 15 to FIG. 17.

As illustrated in FIG. 17 and FIG. 18, the flame F expands in the main combustion chamber 7 at once by an initial flame ejecting from the auxiliary chamber 60 in the spark plug 1 in A first embodiment. It can be confirmed that development speed of the flame F in the main combustion chamber 7 is faster in the spark plug 1 in A first embodiment than in the spark plug 91 in comparative a second embodiment in which the auxiliary chamber 60 is not provided illustrated in FIG. 15.

Further, a timing at which the flame F expands in the main combustion chamber 7 is earlier in the spark plug 1 in A first embodiment than in the spark plug 9 in a first comparative embodiment with no injection hole 611 in the axial direction illustrated in FIG. 16. Still further, it could be confirmed as indicated in FIG. 18 that flame development speed in the main combustion chamber 7 is higher in the spark plug 1 in A first embodiment than flame development speed in the spark plug 9 in a first comparative embodiment.

It can be seen from the above results that development speed of the flame F in the main combustion chamber 7 is higher and the flame is likely to be ejected to the main combustion chamber 7 promptly in the spark plug 1 in A first embodiment. Thus, it can be considered that an air-fuel mixture in the main combustion chamber 7 can be ignited reliably and efficiently while a cooling loss due to contact between the flame and the auxiliary chamber forming portion 6, or the like, occurring as a result of the flame remaining in the auxiliary chamber 60 is reduced.

Second Embodiment

Figure 19:
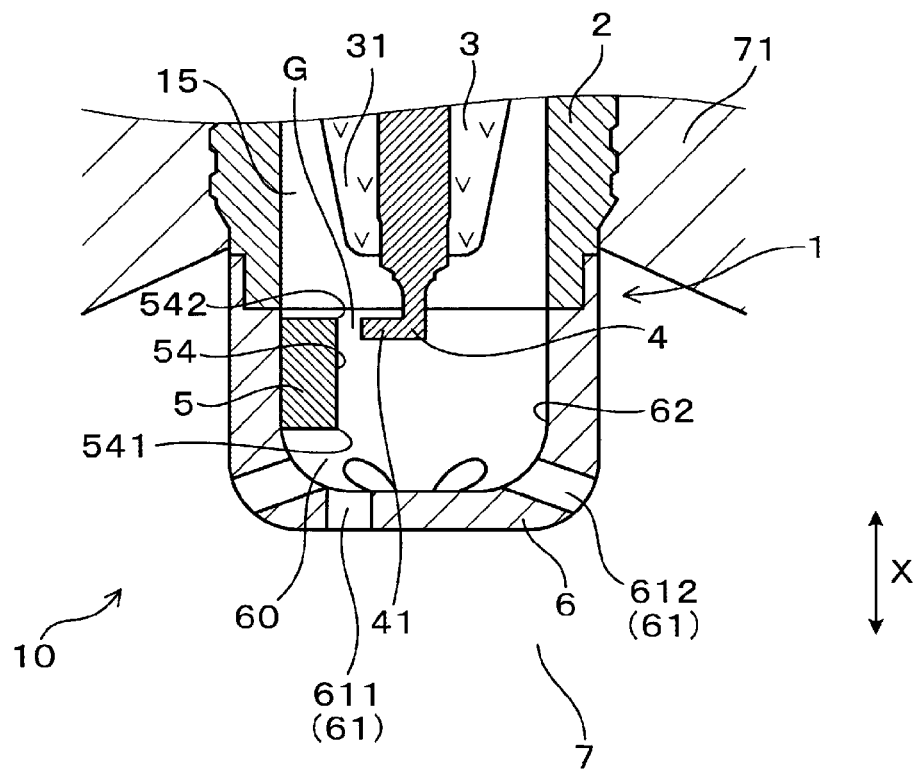
FIG. 19 is a cross-sectional diagram for explaining a distal end portion of a spark plug in a second embodiment.
Figure 20:
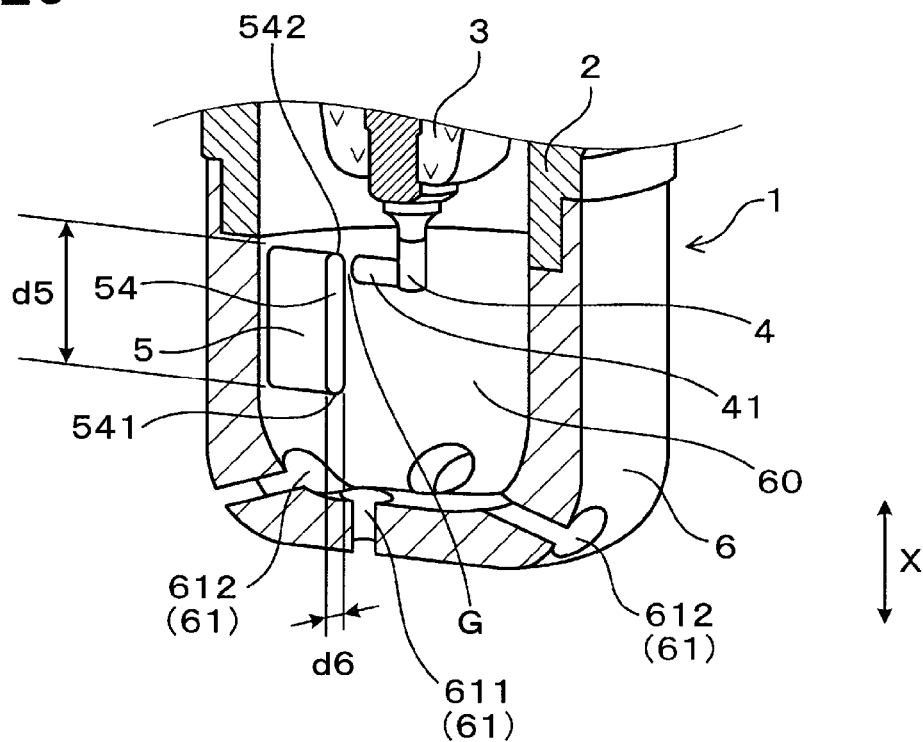
FIG. 20 is a perspective view of a partial cross-section of the distal end portion of the spark plug in the second embodiment.

The present embodiment is an embodiment in which the ground electrode 5 is formed in an elongated shape in the axial direction of the spark plug X as illustrated in FIG. 19 and FIG. 20.

In other words, in the present embodiment, the ground electrode 5 projects from the inner wall surface 62 of the auxiliary chamber forming portion 6 toward the auxiliary chamber 60 and has a shape elongated in the axial direction of the spark plug X. In other words, the ground electrode 5 has an elongated shape in the axial direction of the spark plug X rather than in the spark plug circumferential direction. In other words, dimensions d5 and d6 illustrated in FIG. 20 have a relationship of d5>d6. Further, a distal end edge 541 on a discharge surface 54 that is a surface on the discharge gap G side in the ground electrode 5 is disposed closer to the distal end than the center electrode 4.

Further, a proximal end edge 542 on the discharge surface 54 in the ground electrode 5 is disposed at a position substantially equal in the axial direction of the spark plug to the distal end portion of the center electrode 4.

The second embodiment is similar to the first embodiment in other points. Note that reference numerals that are the same as the reference numerals used in the above embodiments among reference numerals used in A second embodiment and subsequent examples indicate components, and the like, similar to those in the above embodiments unless otherwise described.

In the present embodiment, initial discharge at the discharge gap G is likely to occur between the proximal end edge 542 on the discharge surface 54 of the ground electrode 5 and the center electrode 4. Thereafter, a point of origin of the spark discharge S on the ground electrode 5 side moves toward the distal end due to the air flow in the auxiliary chamber 60. Then, the point of origin of the spark discharge S moves to the distal end edge 541 on the discharge surface 54 of the ground electrode 5. This expands a distance between points of origin of the spark discharge S. This results in making it possible to improve ignition performance in the auxiliary chamber 60.

Other operational effects similar to those in the first embodiment are provided.

Third Embodiment

Figure 21:
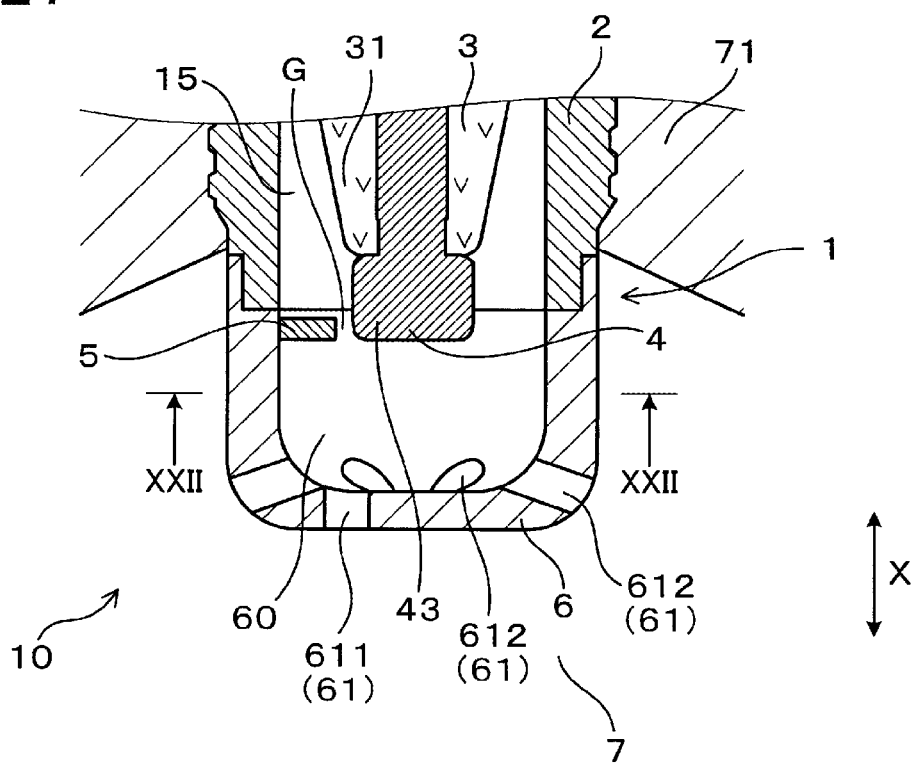
FIG. 21 is a cross-sectional diagram for explaining a distal end portion of a spark plug in a third embodiment.
Figure 22:
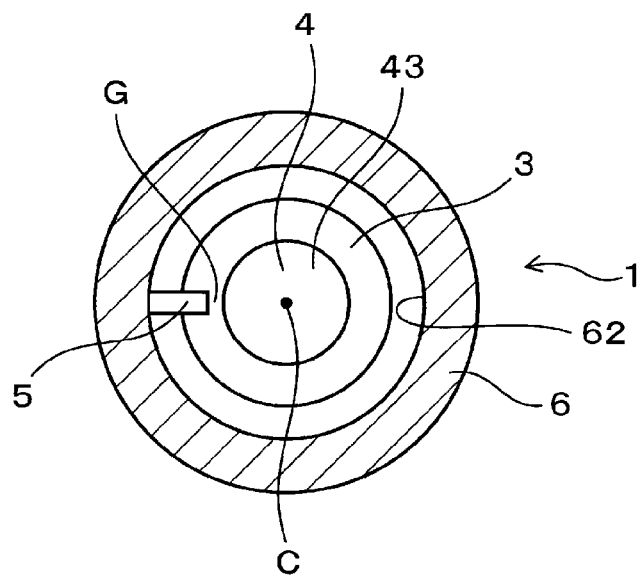
FIG. 22 is a cross-sectional diagram view taken along a line XXII-XXII in FIG. 21.

The present embodiment is an embodiment in which a large diameter portion 43 having a large diameter is provided at the distal end portion of the center electrode 4 as illustrated in FIG. 21 and FIG. 22.

In other words, the distal end portion of the center electrode 4 is made to project in a radial direction over the entire circumference. This keeps the position of the discharge gap G away from the spark plug center axis C.

The third embodiment is similar to the first embodiment in other points.

In the present embodiment, the large diameter portion 43 in a columnar shape is provided at the distal end portion of the center electrode 4, so that the position of the discharge gap G can be adjusted. This can improve productivity.

Other operational effects similar to those in the first embodiment are provided.

Fourth Embodiment

Figure 23:
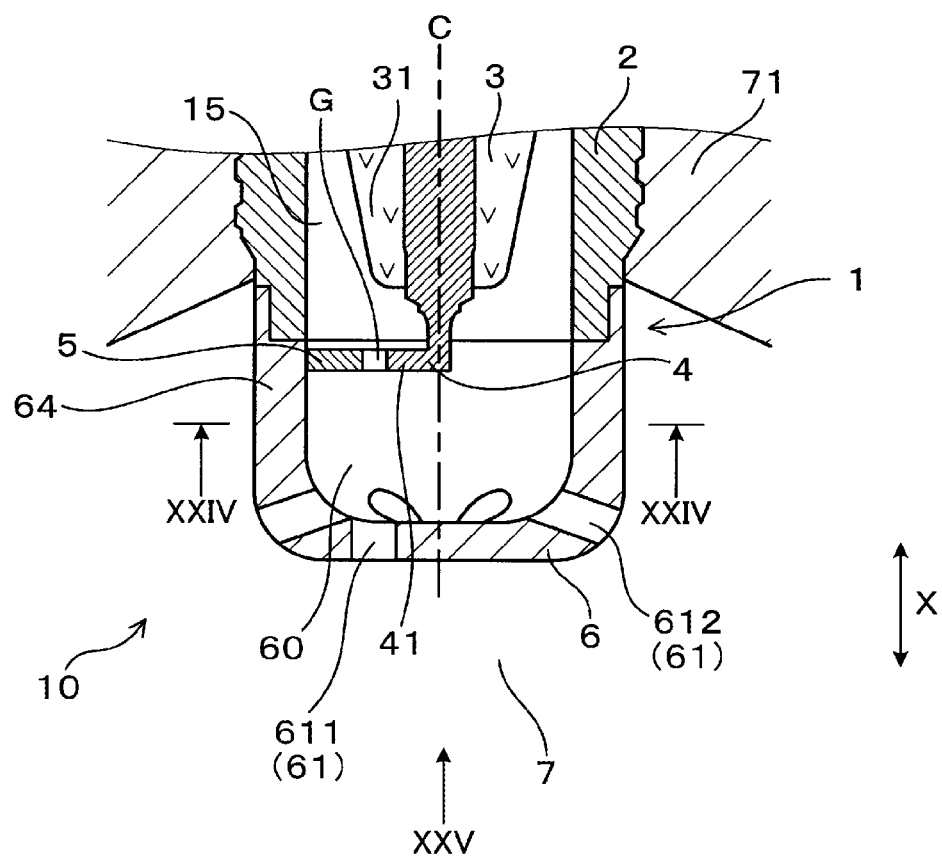
FIG. 23 is a cross-sectional diagram for explaining a distal end portion of a spark plug in a fourth embodiment and is a view corresponding to a cross-sectional diagram taken along a line XXIII-XXIII in FIG. 25.
Figure 24:
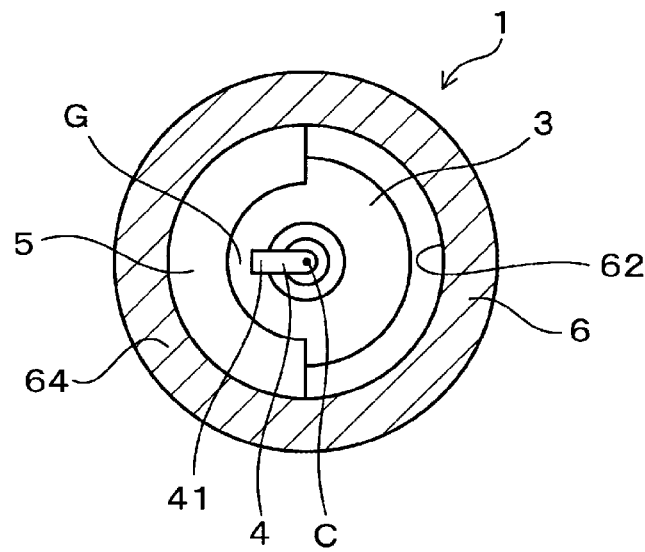
FIG. 24 is a cross-sectional diagram view taken along a line XXIV-XXIV in FIG. 23.
Figure 25:
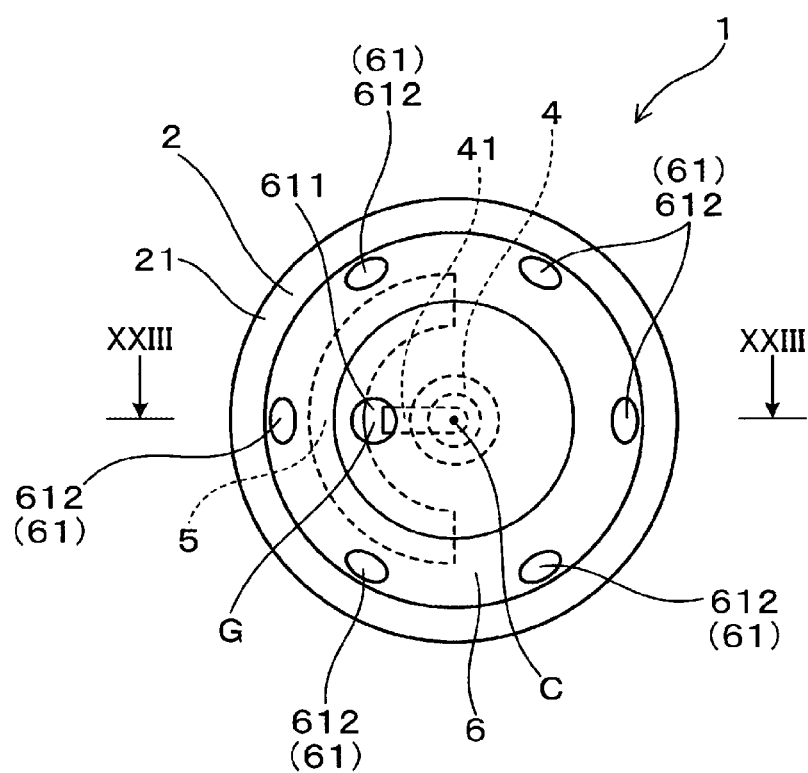
FIG. 25 is a plan view viewed in a direction of an arrow XXV in FIG. 23.

The present embodiment is an embodiment in which the ground electrode 5 is formed in a semicircular shape over a half circumference around the spark plug center axis C of the spark plug 1 as illustrated in FIG. 23 to FIG. 25.

In other words, when the spark plug 1 is viewed in the X direction, as illustrated in FIG. 24 and FIG. 25, the ground electrode 5 is made to project from the inner wall surface 62 of the auxiliary chamber forming portion 6 over a range of 180° in a circumferential direction on a side close to the injection hole 611 in the axial direction.

The fourth embodiment is similar to the first embodiment in other points.

In the present embodiment, when the spark plug 1 is viewed in the X direction, the discharge gap G can be formed in a wide range close to the injection hole 611 in the axial direction.

Note that an angle range in which the ground electrode 5 is formed when viewed in the axial direction of the spark plug X can be set at less than 180° other than 180° as illustrated in FIG. 24.

Other operational effects similar to those in the first embodiment are provided.

Fifth Embodiment

Figure 26:
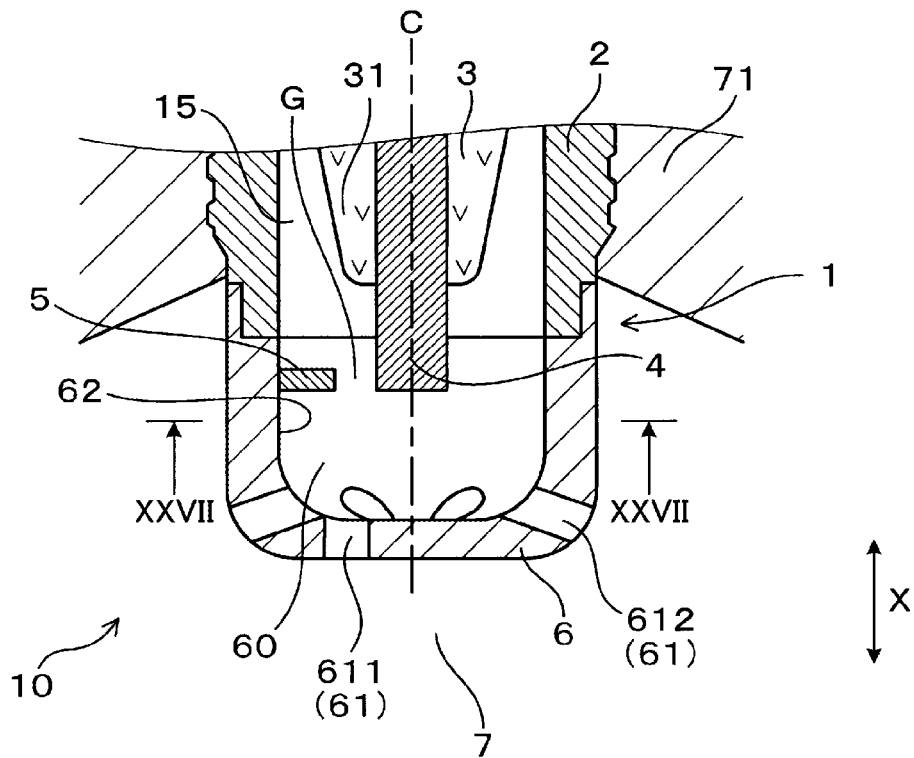
FIG. 26 is a cross-sectional diagram for explaining a distal end portion of a spark plug in a fifth embodiment.
Figure 27:
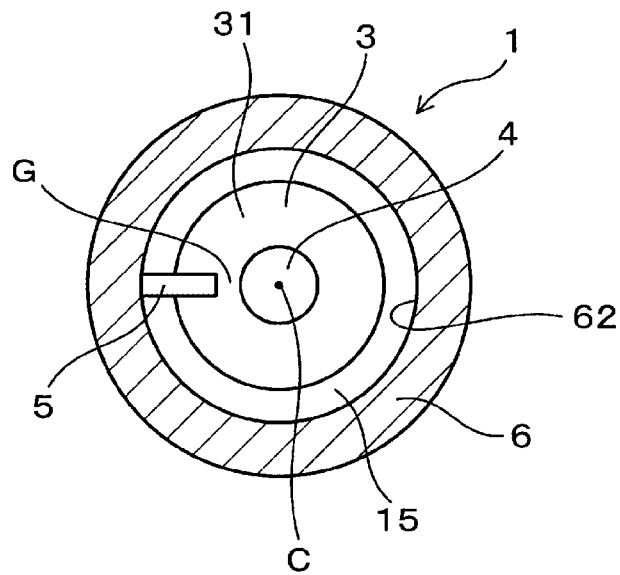
FIG. 27 is a cross-sectional diagram view taken along a line XXVII-XXVII in FIG. 26.

The present embodiment is an embodiment in which the electrode projecting portion 41 (see FIG. 1) is not provided at the center electrode 4 as illustrated in FIG. 26 and FIG. 27.

Further, a projecting end of the ground electrode 5 projecting from the inner wall surface 62 of the auxiliary chamber forming portion 6 is made to face a side surface of the center electrode 4. By this means, the discharge gap G is formed between the side surface of the center electrode 4 and the ground electrode 5.

The fifth embodiment is similar to the first embodiment in other points.

In the present embodiment, the electrode projecting portion 41 does not have to be provided at the center electrode 4, so that a relatively simple configuration can be achieved. It is therefore possible to obtain the spark plug 1 excellent in productivity.

Other operational effects similar to those in the first embodiment are provided.

The present disclosure is not limited to the above-described embodiments and can be applied to various embodiments in a range not deviating from the gist of the present disclosure.

While the present disclosure has been described with reference to the embodiments, it is understood that the present disclosure is not limited to the embodiments and structures. The present disclosure incorporates various modified embodiments and modifications within an equivalent range. In addition, various combinations, forms, and other combinations and forms including only one element or more or less elements fall within the scope and the concept of the present disclosure.

What is claimed is:

1. A spark plug for an internal combustion chamber comprising:
   a cylindrical housing;
   a cylindrical insulator held inside the housing;
   a center electrode held inside the insulator and projecting on a distal end side of the insulator;
   a ground electrode facing the center electrode from an outer peripheral side and forming a discharge gap between the ground electrode and the center electrode; and
   an auxiliary chamber forming portion provided at a distal end portion of the housing, wherein
   an auxiliary chamber in which the discharge gap is to be disposed is formed inside the auxiliary chamber forming portion,
   a distance in an axial direction between the discharge gap and a distal end of the auxiliary chamber is equal to or greater than a maximum wall thickness of the auxiliary chamber forming portion,
   the auxiliary chamber forming portion includes injection holes through which the auxiliary chamber is communicated with outside of the auxiliary chamber forming portion,
   the injection holes are formed in a state where openings on an outer side are located closer to a distal end side than openings on the auxiliary chamber side is,
   at least one of the injection holes is an axial injection hole formed along an axial direction of a plug,
   when viewed in the axial direction of the spark plug, a center of the axial injection hole is eccentric from a center axis of the spark plug toward the discharge gap;
   the center electrode includes an electrode projecting portion projecting outward in a radial direction to a projecting end of the electrode projecting portion;
   the ground electrode projects inward in the radial direction from an inner wall surface of the auxiliary chamber forming portion to a projecting end of the ground electrode;
   the discharge gap is formed between the projecting end of the ground electrode and the projecting end of the electrode projecting portion; and
   when viewed in the axial direction of the spark plug, the discharge gap and the axial injection hole at least partially overlap with each other.

2. The spark plug for the internal combustion engine according to claim 1, wherein
   the auxiliary chamber forming portion includes a plurality of oblique injection holes oblique so as to be away from the spark plug center axis toward the distal end in addition to the axial injection hole as the injection holes, and the axial injection hole is formed at a position closer to the spark plug center axis than the oblique injection holes are.

3. The spark plug for the internal combustion engine according to claim 1, wherein
   the insulator includes a tapered distal end portion having a diameter decreasing toward the distal end, on a cross-section in a plane including the spark plug center axis and passing through the discharge gap, and the discharge gap is formed at a position farther from the spark plug center axis than an extension line of an outer periphery surface of the tapered distal end portion is.

4. The spark plug for the internal combustion engine according to claim 3, wherein
   on the cross-section in the plane including the spark plug center axis and passing through the discharge gap, the axial injection hole is formed at a position farther from the spark plug center axis than the extension line is.

5. The spark plug for the internal combustion engine according to claim 1, wherein the ground electrode is formed in a semicircular shape over a half circumference around the center axis of the spark plug.

6. The spark plug for the internal combustion engine according to claim 1, wherein when viewed in the axial direction of the spark plug, a center of the axial injection hole in the axial direction is disposed at the discharge gap.

* * * * *